United States Patent
Udall et al.

(10) Patent No.: US 8,123,489 B2
(45) Date of Patent: Feb. 28, 2012

(54) HOLLOW AEROFOIL AND A METHOD OF MANUFACTURING A HOLLOW AEROFOIL

(75) Inventors: Kenneth F. Udall, Derby (GB); Jeffrey Allen, Derby (GB); Mark W. Turner, Colne (GB); James M. Townsend, Hartington (GB)

(73) Assignee: Rolls-Royce PLC, London (GB)

( * ) Notice: Subject to any disclaimer, the term of this patent is extended or adjusted under 35 U.S.C. 154(b) by 974 days.

(21) Appl. No.: 12/149,248

(22) Filed: Apr. 29, 2008

(65) Prior Publication Data
US 2008/0290215 A1 Nov. 27, 2008

(30) Foreign Application Priority Data

May 23, 2007 (GB) .................................. 0709838.7

(51) Int. Cl.
*F01D 5/18* (2006.01)
(52) U.S. Cl. ..................................... 416/233; 29/889.72
(58) Field of Classification Search .................. 416/233, 416/232, 500; 29/889.72; 244/123.4
See application file for complete search history.

(56) References Cited

U.S. PATENT DOCUMENTS

| | | | |
|---|---|---|---|
| 1,636,902 A * | 7/1927 | Dewoitine | 244/123.4 |
| 5,165,860 A * | 11/1992 | Stoner et al. | 416/224 |
| 5,348,446 A | 9/1994 | Lee et al. | |
| 6,206,638 B1 | 3/2001 | Glynn et al. | |
| 6,269,540 B1 | 8/2001 | Islam et al. | |
| 7,033,131 B2 | 4/2006 | Schreiber | |
| 2004/0200887 A1 | 10/2004 | Franchet et al. | |
| 2006/0018761 A1* | 1/2006 | Webster et al. | 416/233 |

FOREIGN PATENT DOCUMENTS

| | | |
|---|---|---|
| EP | 1 439 281 A2 | 7/2004 |
| EP | 1 466 692 A1 | 10/2004 |
| GB | 2 272 731 A | 5/1994 |
| JP | 2000248901 A * | 9/2000 |

OTHER PUBLICATIONS

Search Report issued in corresponding European Application No. 08251490 dated Mar. 14, 2011.
Rapid Tooling, Rapid Manufacturing, Rapid Prototyping; Selective Laser Melting; MCP Realizer—SLM Technology; MCP-HEK Tooling; Nov. 2003.

* cited by examiner

*Primary Examiner* — Richard Edgar
(74) *Attorney, Agent, or Firm* — Oliff & Berridge, PLC

(57) ABSTRACT

A hollow aerofoil (30) comprises an aerofoil portion (40) having a leading edge (42), a trailing edge (44), a concave pressure surface wall (46) extending from the leading edge (42) to the trailing edge (44) and a convex suction surface (48) extending from the leading edge (42) to the trailing edge (44). The concave pressure surface wall (46) and the convex suction surface wall (48) are integral and define a cavity (50). A plurality of webs (52) extend across the cavity (50) between the concave pressure surface wall (46) and the convex suction surface wall (48). At least one of the webs (52A) extends substantially perpendicularly to the concave pressure surface wall (46) and the convex suction surface wall (48) and at least one of the webs (52B) extends substantially diagonally to the concave pressure surface wall (46) and the convex suction surface wall (48).

39 Claims, 4 Drawing Sheets

HOLLOW AEROFOIL AND A METHOD OF MANUFACTURING A HOLLOW AEROFOIL

The present invention relates to a hollow aerofoil and a method of manufacturing a hollow aerofoil and in particular to a hollow fan blade and a method of manufacturing a hollow fan blade.

Conventionally turbofan gas turbine engine fan blades are solid metal. There are hollow fan blades comprising two metal sheets and a honeycomb structure and the honeycomb structure is placed between the metal sheets and the metal sheets are brazed together to form the walls of the fan blade. There are also hollow fan blades comprising three metal sheets and the metal sheets are diffusion bonded together in selected positions and superplastically inflated at other selected positions to form the fan blade.

The hollow fan blades are lighter in weight than the conventional fan blade and the diffusion bonded and superplastically formed fan blade is lighter and cheaper and has a greater service life than the honeycomb fan blade.

A problem with the diffusion bonded and superplastically formed fan blades is that the selected positions at which diffusion bonding occurs must have a minimum length and the selected positions at which superplastic inflation occurs must not form angles greater than 60° between webs extending between the walls of the fan blade and the walls of the fan blade. This determines the free length of the walls between the webs and hence the thickness of the walls of the fan blade.

Accordingly the present invention seeks to provide a novel hollow aerofoil and a novel method of manufacturing a hollow aerofoil.

Accordingly the present invention provides a hollow aerofoil comprising an aerofoil portion having a leading edge, a trailing edge, a concave pressure surface wall extending from the leading edge to the trailing edge and a convex suction surface extending from the leading edge to the trailing edge, the concave pressure surface wall and the convex suction surface wall being integral and define a cavity and a plurality of integral webs extending across the cavity between the concave pressure surface wall and the convex suction surface wall, wherein at least one of the webs extending substantially perpendicularly to the concave pressure surface wall and the convex suction surface wall and at least one of the webs extending diagonally to the concave pressure surface wall and the convex suction surface wall.

Preferably at least two webs extending substantially perpendicularly to the concave pressure surface wall and the convex suction surface wall and at least one of the webs extending substantially diagonally between the at least two webs between the concave pressure surface wall and the convex suction surface wall.

Preferably a plurality of webs extending substantially perpendicularly to the concave pressure surface wall and the convex suction surface wall, a plurality of webs extending substantially diagonally between the concave pressure surface wall and the convex suction surface wall and each of the webs extending substantially diagonally extending between a respective pair of adjacent webs extending substantially perpendicularly to the walls.

Preferably the webs extending substantially diagonally to the walls are arranged at angle between 40° and 50° to the walls.

Preferably the webs extending substantially diagonally to the walls are arranged at an angle of 45° to the walls.

Preferably the webs extending substantially perpendicularly to the walls are arranged at an angle between 70° and 90° to the walls. More preferably the webs extending substantially perpendicularly to the walls are arranged at an angle between 75° and 90° to the walls.

Alternatively the webs extending substantially perpendicularly to the walls are arranged at an angle of 80° or 90° to the walls.

Preferably webs extending substantially perpendicularly to the walls and webs extending substantially diagonally to the walls are arranged at a first region of the aerofoil portion of the aerofoil.

Preferably the first region is at a position midway between the leading edge and the trailing edge where the cavity.

Preferably webs extending substantially diagonally to the walls are arranged at a second region of the aerofoil portion of the aerofoil.

Preferably the second region is adjacent the leading edge and/or the trailing edge.

Preferably at least some of the webs are arranged to extend at an angle between 90° and 45° to the walls.

Preferably the webs arranged to extend at an angle between 90° and 45° to the walls are arranged in a third region.

Preferably the third region is between the first region and the second region to form a transition between the first region and the second region.

Preferably the angle between some of the webs and the walls progressively changes between an angle of 45° adjacent the second region and an angle of 80° or 90° adjacent the first region.

Some of the webs extending diagonally may intersect other webs extending diagonally. Some of the webs extending diagonally may intersect two, or three, other webs extending diagonally to form box structures. Some of the substantially perpendicularly extending webs extend from a point of intersection of the diagonally extending webs to one of the walls.

Preferably the hollow aerofoil is a hollow fan blade.

Preferably the hollow aerofoil comprises metal deposited by selective laser melting, selective microwave melting or selective electron beam melting.

The present invention also provides a method of manufacturing a hollow aerofoil comprising an aerofoil portion having a leading edge, a trailing edge, a concave pressure surface wall extending from the leading edge to the trailing edge and a convex suction surface extending from the leading edge to the trailing edge, the concave pressure surface wall and the convex suction surface wall being integral and define a cavity and a plurality of integral webs extending across the cavity between the concave pressure surface wall and the convex suction surface wall, wherein at least one of the webs extending substantially perpendicularly to the concave pressure surface wall and the convex suction surface wall and at least one of the webs extending diagonally to the concave pressure surface wall and the convex suction surface wall, the method comprising (a) depositing a layer of a metal powder onto a platform, (b) directing a radiation beam in a predetermined pattern onto the layer of metal powder to melt and sinter the metal powder to form a layer of the hollow aerofoil, repeating steps (a) and (b) to build up the hollow aerofoil layer by layer.

Preferably the method comprises directing a laser beam onto the layer of metal powder. Alternatively the method comprises directing a microwave beam onto the layer of metal powder. Alternatively the method comprises directing an electron beam onto the layer of metal powder.

The present invention will be more fully described by way of example with reference to the accompanying drawings in which:—

Figure 1:
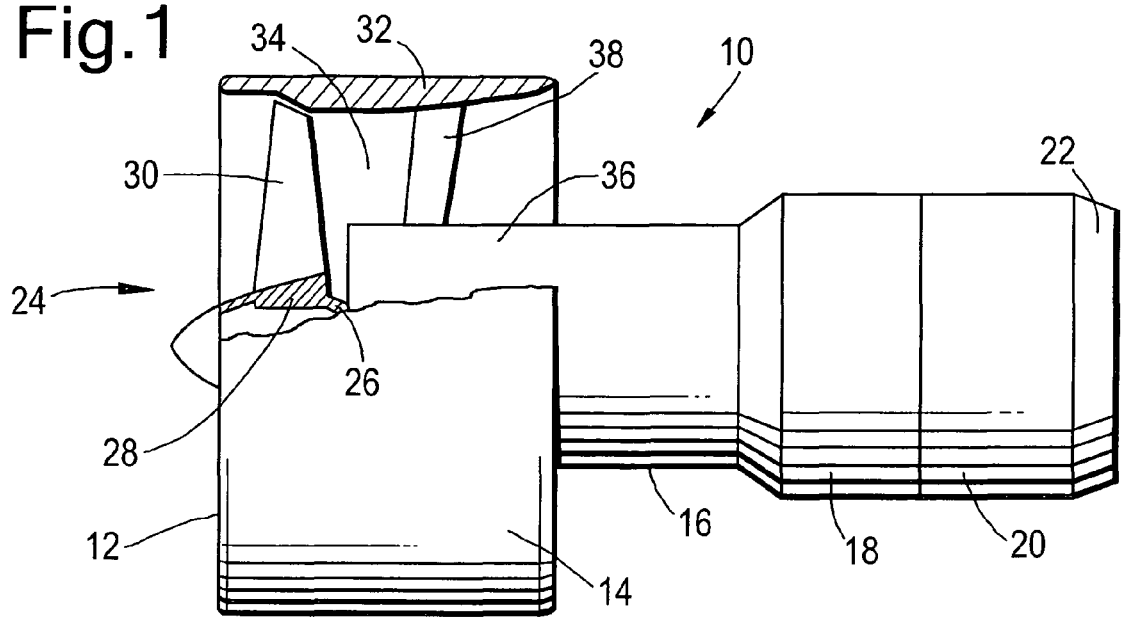
FIG. 1 shows a turbofan gas turbine engine having a hollow blade according to the present invention.

A turbofan gas turbine engine 10, as shown in FIG. 1, comprises in axial flow series an inlet 12, a fan section 14, a compressor section 16, a combustion section 18, a turbine section 20 and an exhaust 22. The turbine section 20 comprises a number of turbines (not shown) arranged to drive one or more compressors (not shown) in the compressor section 16 via respective shafts (not shown) and a turbine (not shown) to drive a fan 24 in the fan section 14 via a shaft 26. The fan 24 comprises a fan rotor 28, which carries a plurality of circumferentially spaced generally radially outwardly extending fan blades 30. A fan casing 32 surrounds the fan 24 and the fan casing 32 partially defines a fan duct 34. The fan casing 32 is supported from a core engine casing 36 by a plurality of circumferentially spaced generally radially extending fan outlet guide vanes 38.

Figure 2:
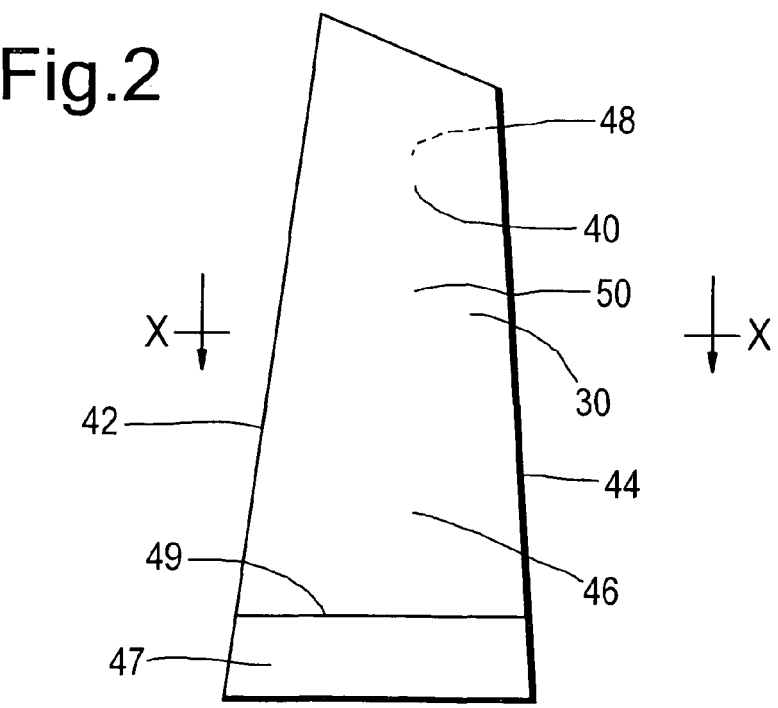
FIG. 2 shows an enlarged view of a hollow blade according to the present invention.
Figure 3:
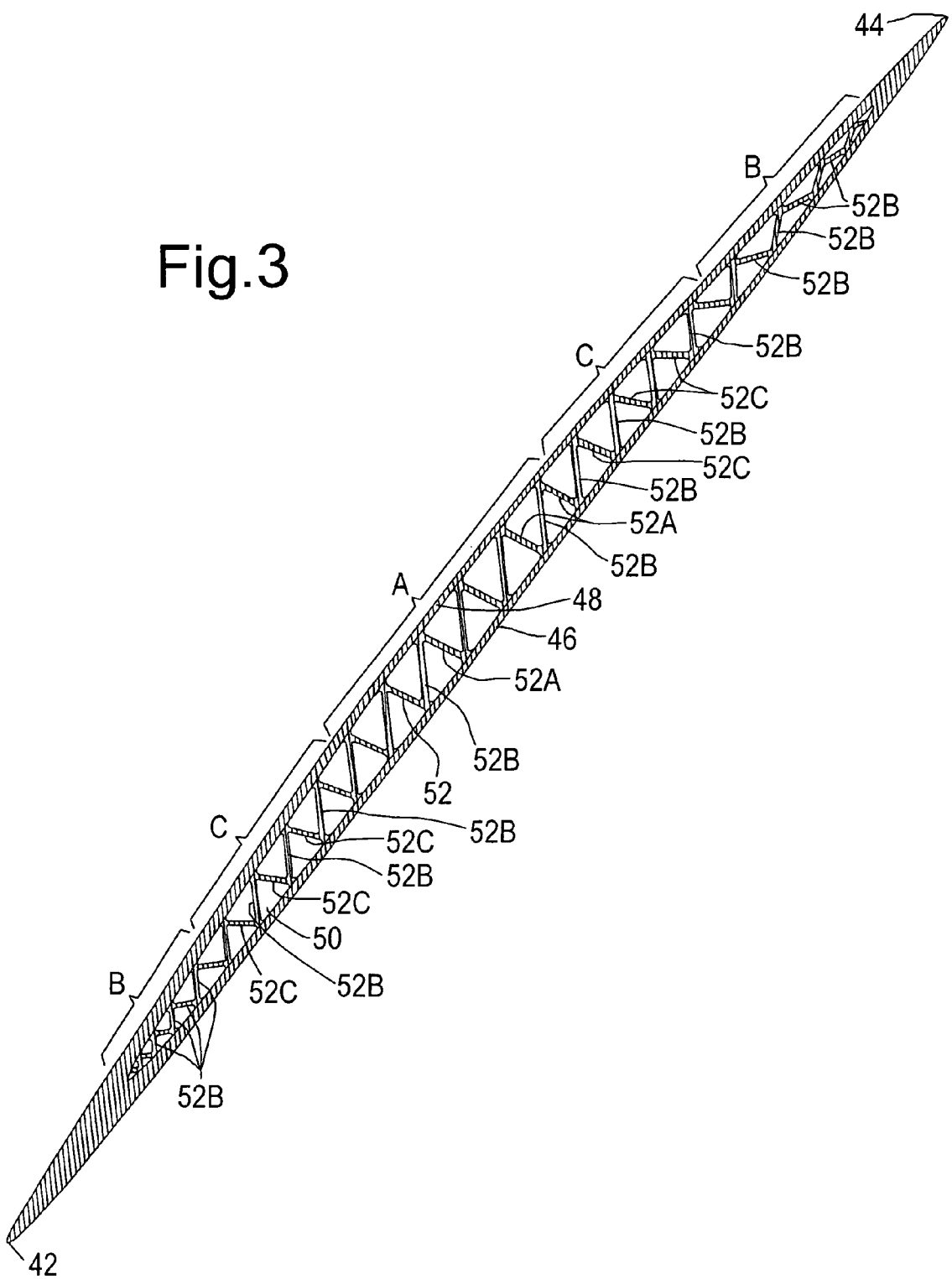
FIG. 3 shows an enlarged cross-sectional through the hollow blade along line X-X.
Figure 4:
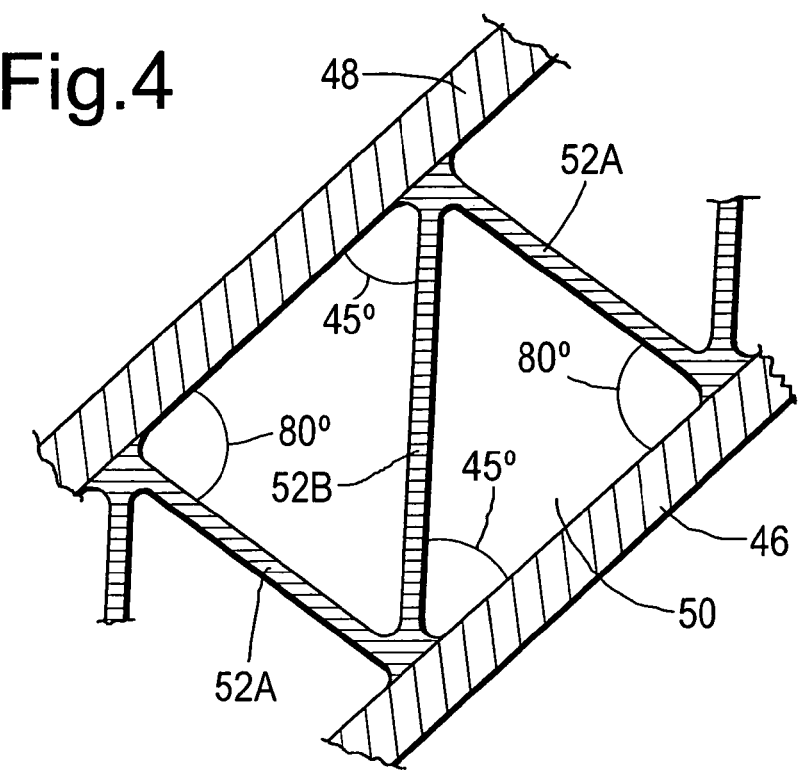
FIG. 4 is a further enlargement of a portion of FIG. 3.

One of the fan blades 30 is shown more clearly in FIGS. 2, 3 and 4 and the fan blade 30 comprises an aerofoil portion 40 having a leading edge 42, a trailing edge 44, a concave pressure surface wall 46 extending from the leading edge 42 to the trailing edge 44 and a convex suction surface wall 48 extending from the leading edge 42 to the trailing edge 44. The concave pressure surface wall 46 and the convex suction surface wall 48 are integral and define a cavity 50 within the fan blade 30. A plurality of webs 52 extend across the cavity 50 between the concave pressure surface wall 46 and the convex suction surface wall 48 and the webs 52 are integral with the concave pressure surface wall 46 and the convex suction surface wall 48. At least one of the webs 52A extends substantially perpendicularly to the concave pressure surface wall 46 and also extends substantially perpendicularly to the convex suction surface wall 48 and at least one of the webs 52B extends substantially diagonally to the concave pressure surface wall 46 and substantially diagonally to the convex suction surface wall 48. The fan blade 30 has a root 47, which may be hollow, and the fan blade 30 may also have an integral platform 49, which may be hollow or ribbed for out of plane bending stiffness.

The webs 52 have controlled fillet radii at all junctions with the pressure surface wall 46, the suction surface wall 48 or other adjacent webs 52 to control the notch root peak stress. The webs may be locally thickened, shaped or radially waved to control buckling strength, stiffness or strength.

It is to be noted, as shown more clearly in FIGS. 3 and 4, that between two webs 52A extending substantially perpendicularly to the concave pressure surface wall 46 and extending substantially perpendicularly to the convex suction surface wall 48 there is at least one of the webs 52B extending substantially diagonally between the at least two webs 52A between the concave pressure surface wall 46 and the convex suction surface wall 48.

It is preferred that a plurality of webs 52A extend substantially perpendicularly to the concave pressure surface wall 46 and substantially perpendicularly to the convex suction surface wall 48 and that a plurality of webs 52B extend substantially diagonally between respective pairs of adjacent webs 52A extending substantially perpendicularly between the concave pressure surface wall 46 and the convex suction surface wall 48.

These webs 52B extending substantially diagonally are arranged at angle of between 40° and 50°, preferably 45°, to the walls 46 and 48. These webs 52A extending substantially perpendicularly are arranged at an angle of between 70° and 90°, more preferably at an angle between 75° and 80° to the walls, in this example 80°, to the walls 46 and 48.

The webs 52A extending substantially perpendicularly to the walls 46 and 48 and the webs 52B extending substantially diagonally to the walls 46 and 48 are arranged at a first region A of the aerofoil portion 40 of the fan blade 30.

Only webs 52B extending substantially diagonally to the walls 46 and 48 are arranged at a second region B of the aerofoil portion 40 of the fan blade 30, for example at angles of +/−45° to the walls 46 and 48.

Generally the first region A is at a position close to midway between the leading edge 42 and the trailing edge 44 of the fan blade 30, where the height of the cavity 50 is greatest, and the second region B is adjacent the leading edge 42 and/or the trailing edge 44 of the fan blade 30. In the second region B at the leading edge 42 the pitch of the webs is reduced whilst keeping the angles constant with decreasing distance to the leading edge 42 and in the second region B at the trailing edge 44 the pitch reduction is minimised and the angles are decreased with decreasing distance to the trailing edge 44.

Additionally some of the webs 52C are arranged to extend at an angle between 90° and 45° to the walls 42 and 46. The webs 52C arranged to extend at an angle between 90° and 45° to the walls 46 and 48 and the webs 52B arranged to extend substantially diagonally at an angle of 45° to the walls 46 and 48 are arranged in a third region C. The third region C is between the first region A and the second region B and forms a transition between the first region A and the second region B.

The angle between some of the webs 52C and the walls 46 and 48 progressively changes from an angle of about 45° adjacent the second region B to an angle of about 90° adjacent the first region A.

More generally in the first region A there are webs 52A arranged at an angle of 70° to 90° and webs 52B arranged at an angle of 40° to 50°, in the second region B there are webs 52B arranged at an angle of +/−40° to +/−50° and in the third region there are webs 52B arranged at an angle of 40° to 50° and webs 52C arranged at an angle between 40° and 90°.

Preferably the webs 52B adjacent the leading edge 42 are arranged at an angle of 45° and the web spacing progressively reduces towards the leading edge 42 to increase the core strength. Preferably the angles of the webs 52B adjacent the trailing edge 44 are below an angle of 45° to minimise the core density increase towards the trailing edge 44.

This arrangement of webs 52 produces a core, in the aerofoil portion 40 of the fan blade 30, which has a transverse one way shear capability, from bird impact leading edge cupping, in which the compressive webs 52A are essentially, or nearly, perpendicular/normal to the concave pressure wall 46 and the convex suction wall 48 and the tensile webs 52B forms diagonal truss cell braces.

The lower angle of the tensile webs 52B reduces the through thickness pull in load for a given shear load. The core is finer and the finer core reduces the shear load per web 52, offsetting the reduced contribution from the compressive webs 52A angle change. The shorter length of the compressive webs 52A stiffens the compressive webs 52A against buckling and the lower side shear load reduces the buckling load. In combination, these effects allow a thinner and lighter core to a buckling limit. In the tip region of the aerofoil portion 40 the core may also be waved to improve the buckling strength where the fan blade 30 is thinner, because the radial tensile stresses in the radially continuous webs 52 falls towards the tips. A one piece manufacturing method allows a minimal attachment width at the web 52 to wall 46 and 48 joint.

At the trailing edge 44 the angle of the webs 52 in the core in region B may be allowed to flatten to minimise the core density. The fillet radius may also be reduced to minimise the weight of the trailing edge 44. This may allow a reduction in trailing edge length in conjunction with a reduction in thickness of the walls 46 and 48 at the trailing edge 44.

The webs in the core change from an arrangement in which alternate webs 52A and 52B are arranged at 80° and 45° respectively to the walls 46 and 48 at region A through regions C to an arrangement where alternate webs 52B are arranged symmetrically at +/−45° to the walls 46 and 48 in regions B. The symmetric arrangement of the webs 52B in regions B maintains structural stiffness of the core to the highly loaded leading edge 42.

The webs 52 are either arranged such that there is a constant length of a cell in the chordal direction. Alternatively the webs may be arranged such that there is a constant diagonal angle and a constant compressive web 52A chordal length, but this changes the rate at which the compressive web 52A angle changes with cavity 50 height. The aim is to maintain a good buckling form in region A until the height of the cavity 50 reduces and then to provide a better shear form in regions B.

The compressive webs 52A in the region A are provided on the attachment ends of the tensile diagonal webs 52B and the compressive web 52A free buckling length, attachment width and unsupported wall 46 and 48 length are minimised, whilst keeping the projected web 52 intersection close to the walls 46 and 48 to minimise local couples. There is a large fillet radius to control peak stresses and stiffen the ends of the webs 52.

Further refinement to the arrangement is possible by varying the shape and/or thickness of the webs. Constant thickness is shown in the figures.

Figure 5:
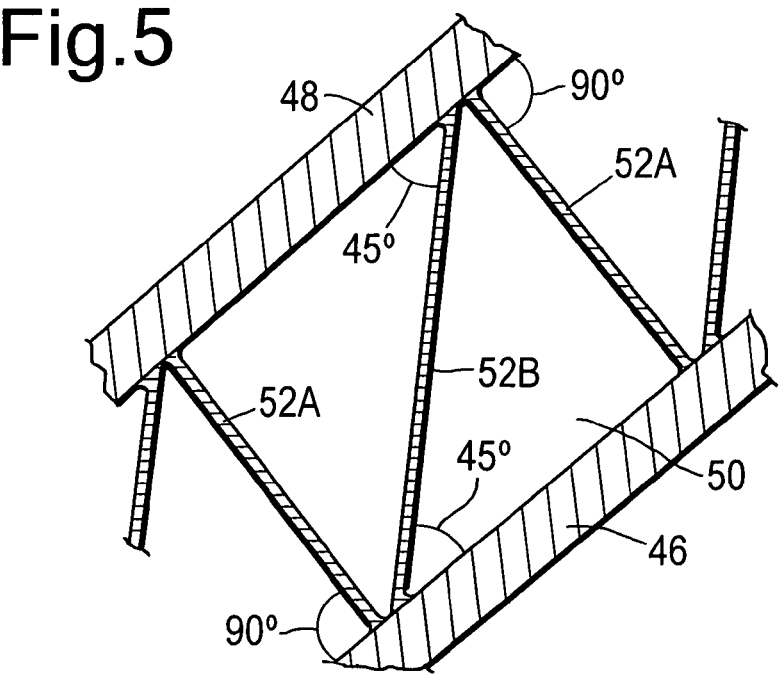
FIG. 5 is an alternative further enlargement of a portion of FIG. 3.

A further arrangement of substantially perpendicularly extending webs 52A and substantially diagonally extending webs 52B is shown in FIG. 5 and is similar to that shown in FIG. 4. In FIG. 5 the webs 52A are arranged at an angle of 90° to the walls 46 and 48 and the webs 52B are arranged at an angle of 45° to the walls 46 and 48. The webs 52A and 52B are thinner than those in FIG. 4 and the compressive webs 52A are steeper than those in FIG. 4 and the joint between the webs 52A and walls 46 and 48 are separate from the joints between the webs 52B and the walls 46 and 48. This may give a peak stress advantage in the walls 46 and 48 for a buckling loss. The projected web load intersection is close to the wall neutral axis.

Figure 6:
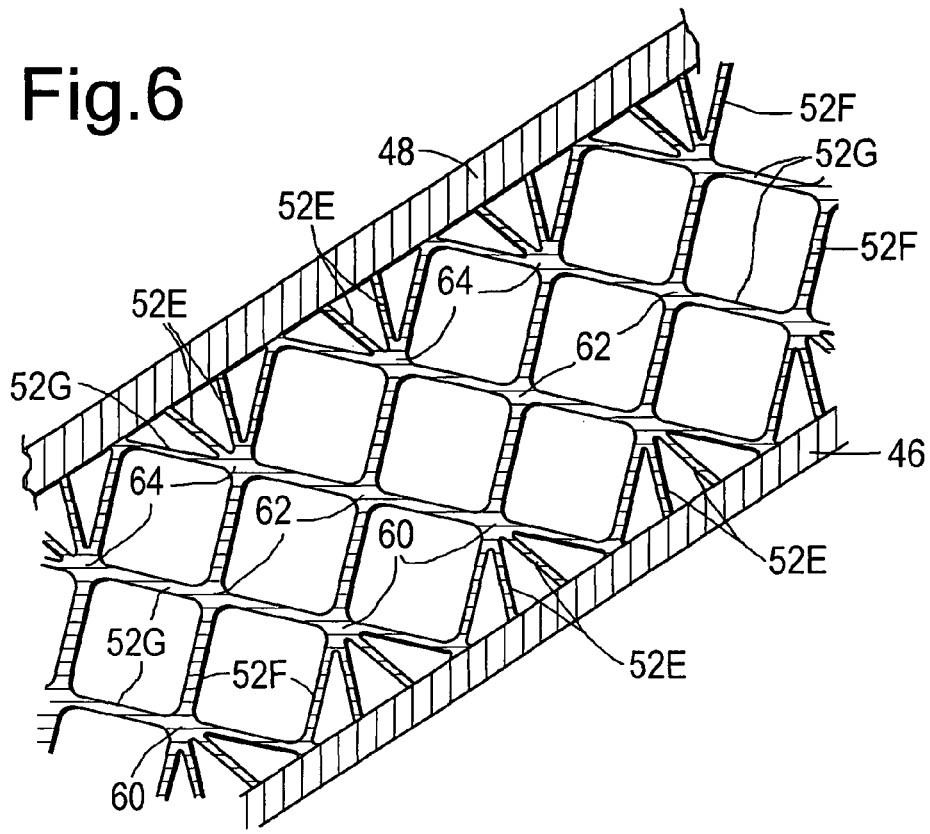
FIG. 6 shows an alternative enlarged cross-sectional through the hollow blade along line X-X.

Another arrangement of substantially perpendicularly extending webs 52E and substantially diagonally extending webs 52F and 52G is shown in FIG. 6. Some of the webs 52F extending substantially diagonally intersect other webs 52G extending substantially diagonally at intersections 60, 62 and 64. Some of the webs 52F extending diagonally may intersect two, or three, other webs 52G extending substantially diagonally to form box structures. The webs 52F and 52G are arranged at an angle of 40° to 50°, preferably 45°, to the walls 46 and 48. The substantially perpendicularly extending webs 52E extend from a point of intersection 60 or 64 of the diagonally extending webs 52F and 54G to a respective one of the walls 46 or 48. The substantially perpendicularly extending webs 52E are arranged at an angle between 70° and 90°, 70° in this example. There are one, two or more webs 52E extending from each intersection 60 or 64 to the respective one of the walls 46 and 48. The webs 52F and 52G intersect at an angle of approximately 90°.

This arrangement provides a graded core, giving finer support for the walls 46 and 48 and allows the walls 46 and 48 to be thinner and lighter in weight. The elements of the webs are shorter, thinner, offsetting buckling length for thickness. The webs to the walls 46 and 48 are steeper than optimum. The overall effect is of a controlled section foam type core, but with radially oriented radial load bearing webs.

Although the present invention has been described with reference to a hollow fan blade, the present invention is equally applicable to a hollow prop fan blade, a hollow propeller blade, a hollow fan outlet guide vane, a hollow engine section stator vane, or other hollow aerofoils. The reduced tip speed and bluffer aerofoil sections of prop fan blades, or propeller blades, means that a radially waved core may extend down to the root. The fine core may support fine pressure and suction surface walls. An exterior polyurethane coating may be provided for erosion protection and may provide a hysteresis vibration damping function.

The main advantage of the present invention is a reduction in weight, reduction in cost, more economical use of metal, preferably titanium alloy, manufacturing process simplification, increased manufacturing flexibility.

Further advantages are that the hollowness of the aerofoil may be increased and it may be possible to make smaller aerofoils hollow, or the size at which aerofoils are made hollow is reduced. The thickness of the concave pressure surface wall and the thickness of the convex suction wall may be reduced due to better support from the webs and the elimination of wall and core/web thickness ratio limits in the current manufacturing process.

Figure 7:
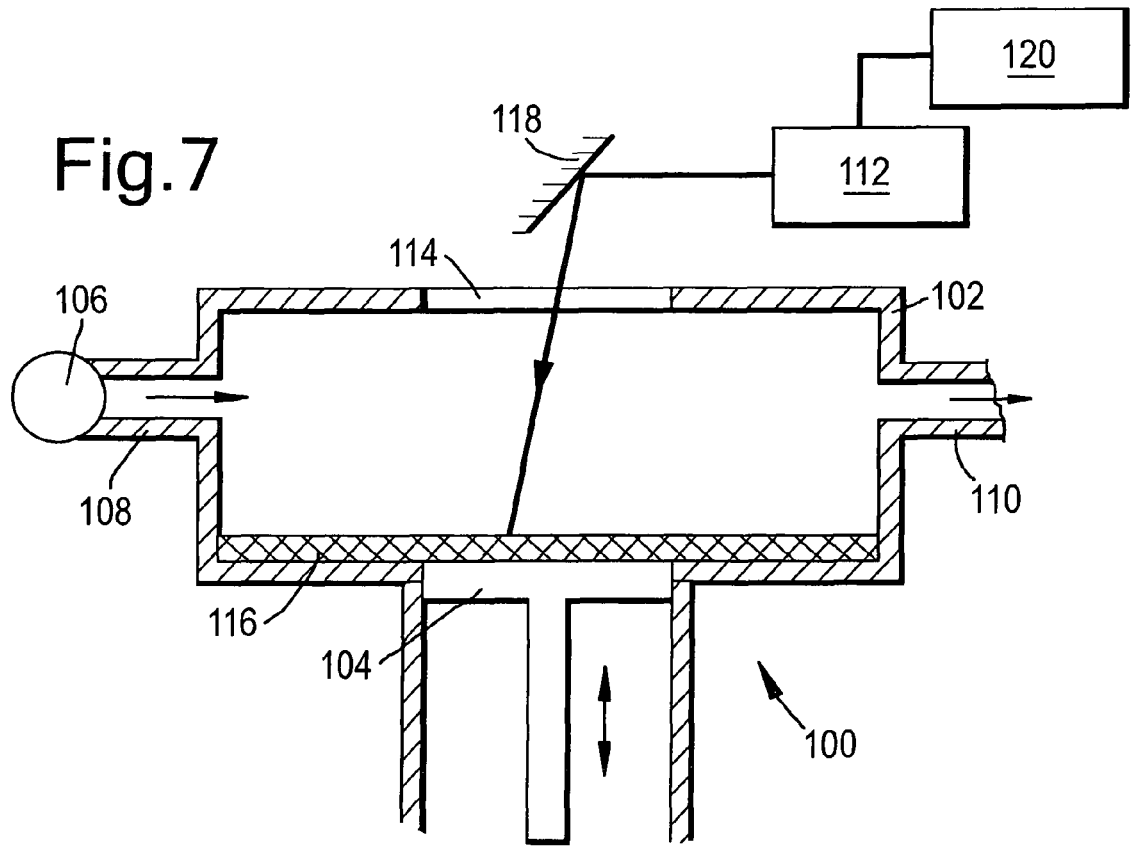
FIG. 7 shows an apparatus for manufacturing a hollow fan blade according to the present invention.

The hollow fan blade, or hollow aerofoil, 30 is manufactured by selective laser melting using an apparatus shown in FIG. 7. The apparatus 100 comprises a sealed chamber 102, which has a retractable platform 104. A pump 106 is provided to supply an inert gas, argon or nitrogen, through a pipe 108 into the chamber 102 and gas is extracted from the chamber 102 via a pipe 110. A laser 112, e.g. an infrared laser, is provided to direct a laser beam through a window 114 in the chamber 102. A controller 120 has a CAD definition of the shape of the hollow aerofoil 30 and the laser 112 is moved under the control of controller 120.

The hollow fan blade 30, or hollow aerofoil, is manufactured by placing a layer 116 of a suitable metal, or alloy, powder, on the retractable platform 104 in the sealed chamber 102. The laser beam melts and fuses or sinters the metal powder where it strikes the layer of metal powder 116. The laser beam is scanned across the layer of metal powder 116 in a predetermined pattern to form a first layer of the hollow aerofoil 30 by bodily moving the laser appropriate distances in perpendicular X and Y directions or by deflecting the laser beam of a movable mirror 118. Then a second, thin, layer of metal, or alloy, is placed on the first layer, the platform 104 is retracted one increment outwards from the chamber 102 and the laser beam is scanned across the layer of metal powder in a further predetermined pattern to form a second layer of the hollow aerofoil 30. The process of placing layers of metal powder, retracting the platform 104 and scanning the laser beam across the layer of metal powder in a predetermined pattern is repeated a sufficient number of times to build the hollow aerofoil 30 layer by layer from root to tip, or end to end. The predetermined pattern of scanning of the laser beam for each layer is determined by the CAD model of the hollow aerofoil 30. Thus, the layers of the hollow aerofoil 30 will be solid to define an end/root, the root may itself be hollow, then subsequent layers will define the concave pressure wall 46, the convex suction wall 48 and the webs 52 of the hollow aerofoil 30 and finally the layers will be solid to define an end/tip of the hollow aerofoil 30. Thus, the hollow aerofoil 30 is built up layer by layer by melting and fusing or sintering the metal powder. It is necessary to remove the un-fused, or un-sintered, metal powder from the hollow aerofoil 30 and this may be by inverting the hollow aerofoil 30 to pour out the metal powder. This may be assisted by vibration, air blast etc. All the internal cavities terminate in a tip gallery, with a final extraction hole to allow powder removal. The root 47, and platform 49 if present, is also formed by this manufacturing process.

Preferably the metal powder is a steel alloy, eg stainless steel, or a titanium alloy, for example Ti64, eg a titanium alloy consisting of 6 wt % aluminium 4 wt % vanadium and remainder titanium minor alloying constituents and impurities.

Preferably several different alloys are used for example a harder alloy may be used at the centre of the leading edge of the hollow aerofoil and a softer alloy may be used at the sides of the leading edge to form a self sharpening leading edge.

Although the present invention has been described with reference to the use of a laser beam to provide selective laser melting and fusing/sintering the metal powder it may be possible to use other types of radiation beam, for example microwave radiation to provide selective microwave melting or electron beam radiation to provide selective electron beam melting etc.

It may be possible to manufacture the hollow aerofoil using shaped metal deposition by depositing molten metal from a welding torch.

We claim:

1. A hollow aerofoil comprising an aerofoil portion having a leading edge, a trailing edge, a concave pressure surface wall extending from the leading edge to the trailing edge and a convex suction surface wall extending from the leading edge to the trailing edge, the concave pressure surface wall and the convex suction surface wall being integral and defining a cavity and a plurality of webs extending across the cavity between the concave pressure surface wall and the convex suction surface wall, wherein at least one of the webs extends substantially perpendicularly to the concave pressure surface wall and the convex suction surface wall and at least one of the webs extends substantially diagonally to the concave pressure surface wall and the convex suction surface wall, wherein
some of the webs extending substantially diagonally intersect other webs extending substantially diagonally, and
some of the webs extending substantially diagonally intersects two, or three, other webs extending substantially diagonally to form box structures.

2. A hollow aerofoil as claimed in claim 1 wherein some of the webs extending substantially perpendicularly extend from a point of intersection with the webs extending substantially diagonally.

3. A method of manufacturing a hollow aerofoil comprising an aerofoil portion having a leading edge, a trailing edge, a concave pressure surface wall extending from the leading edge to the trailing edge and a convex suction surface wall extending from the leading edge to the trailing edge, the concave pressure surface wall and the convex suction surface wall being integral and define a cavity and a plurality of integral webs extending across the cavity between the concave pressure surface wall and the convex suction surface wall, wherein at least one of the webs extending substantially perpendicularly to the concave pressure surface wall and the convex suction surface wall and at least one of the webs extending diagonally to the concave pressure surface wall and the convex suction surface wall, the method comprising (a) depositing a layer of a metal powder onto a platform, (b) directing a radiation beam in a predetermined pattern onto the layer of metal powder to melt and sinter the metal powder to form a layer of the hollow aerofoil, repeating steps (a) and (b) to build up the hollow aerofoil layer by layer.

4. A method as claimed in claim 3 comprising directing a laser beam onto the layer of metal powder.

5. A method as claimed in claim 3 comprising directing a microwave beam onto the layer of metal powder.

6. A method as claimed in claim 3 comprising directing an electron beam onto the layer of metal powder.

7. A method as claimed in claim 3 wherein at least two webs extend substantially perpendicularly to the concave pressure surface wall and the convex suction surface wall and at least one of the webs extending substantially diagonally between the at least two webs between the concave pressure surface wall and the convex suction surface wall.

8. A method as claimed in claim 7 wherein a plurality of webs extending substantially perpendicularly to the concave pressure surface wall and the convex suction surface wall, a plurality of webs extends substantially diagonally between the concave pressure surface wall and the convex suction surface wall and each of the webs extends substantially diagonally extending between a respective pair of adjacent webs extending substantially perpendicularly to the walls.

9. A method as claimed in claim 3, wherein the webs extending substantially diagonally to the walls are arranged at angle between 40° and 50° to the walls.

10. A method as claimed in claim 9 wherein the webs extending substantially diagonally to the walls are arranged at angle of 45° to the walls.

11. A method as claimed in claim 3 wherein the webs extending substantially perpendicularly to the walls are arranged at an angle between 70° and 90° to the walls.

12. A method as claimed in claim 11 wherein the webs extending substantially perpendicularly to the walls are arranged at an angle of 80° or 90° to the walls.

13. A method as claimed in claim 3 wherein webs extending substantially perpendicularly to the walls and webs extending substantially diagonally to the walls are arranged at a first region of the aerofoil portion of the aerofoil.

14. A method as claimed in claim 13 wherein the first region is at a position midway between the leading edge and the trailing edge.

15. A method as claimed in claim 13 wherein webs extending substantially diagonally to the walls are arranged at a second region of the aerofoil portion of the aerofoil.

16. A method as claimed in claim 15 wherein the second region is adjacent the leading edge and/or the trailing edge.

17. A method as claimed in claim 15 wherein at least some of the webs are arranged to extend at an angle between 90° and 45° to the walls.

18. A method as claimed in claim 17 wherein the webs arranged to extend at an angle between 90° and 45° to the walls are arranged in a third region.

19. A method as claimed in claim 18 wherein the third region is between the first region and the second region to form a transition between the first region and the second region.

20. A method as claimed in claim 19 wherein the angle between some of the webs and the walls progressively changes between an angle of 45° adjacent the second region and an angle of 80° or 90° adjacent the first region.

21. A method as claimed in claim 3 wherein some of the webs extending substantially diagonally intersect other webs extending substantially diagonally.

22. A method as claimed in claim 21 some of the webs extending substantially diagonally intersects two, or three, other webs extending substantially diagonally to form box structures.

23. A method as claimed in claim 22 wherein some of the webs extending substantially perpendicularly extend from a point of intersection with the webs extending substantially diagonally.

24. A method as claimed in claim 3 wherein the hollow aerofoil is selected from the group comprising a hollow fan blade, a hollow fan outlet guide vane, a hollow propfan blade, a hollow propeller blade and a hollow engine section stator vane.

25. A hollow aerofoil comprising an aerofoil portion having a leading edge, a trailing edge, a concave pressure surface wall extending from the leading edge to the trailing edge, a convex suction surface wall extending from the leading edge to the trailing edge, the concave pressure surface wall and the convex suction surface wall being integral and defining a cavity, a plurality of webs extending across the cavity between the concave pressure surface wall and the convex suction surface wall, the webs being integral with the concave pressure surface wall and the convex suction surface wall, the hollow aerofoil having a first region and a second region, wherein the first region encompasses midway between the leading edge and the trailing edge and the second region is adjacent the leading edge and/or the trailing edge, the first region having a plurality of webs extending substantially perpendicularly to the concave pressure surface wall and the convex suction surface wall and a plurality of webs extending substantially diagonally between the concave pressure surface wall and the convex suction surface wall, each of the webs extending substantially diagonally between the concave pressure surface wall and the convex suction surface wall extending between a respective pair of adjacent webs extending substantially perpendicularly to the concave pressure surface wall and the convex suction surface wall, and the second region having a plurality of webs extending substantially diagonally between the concave pressure surface wall and the convex suction surface wall, the second region only having webs extending substantially diagonally between the concave pressure surface wall and the convex suction surface wall, alternate webs extending substantially diagonally between the concave pressure surface wall and the convex suction surface wall being arranged at opposite angles to the concave pressure surface wall and the convex suction surface wall.

26. A hollow aerofoil as claimed in claim 25 wherein the hollow aerofoil has a third region, the third region being between the first region and the second region, and the third region having a plurality of webs extending substantially diagonally between the concave pressure surface wall and the convex suction surface wall alternating with a plurality of webs extending between the concave pressure surface wall and the convex suction surface wall in which the angle between the webs and the concave pressure surface wall and the convex suction surface wall progressively changes from being substantially diagonal to substantially perpendicular.

27. A hollow aerofoil as claimed in claim 26 wherein at least some of the webs are arranged to extend at an angle between 90° and 45° to the walls.

28. A hollow aerofoil as claimed in claim 27 wherein the webs arranged to extend at an angle between 90° and 45° to the walls are arranged in a third region.

29. A hollow aerofoil as claimed in claim 28 wherein the third region is between the first region and the second region to form a transition between the first region and the second region.

30. A hollow aerofoil as claimed in claim 26 wherein the angle between some of the webs and the walls progressively changes between an angle of 45° adjacent the second region and an angle of 80° or 90° adjacent the first region.

31. A hollow aerofoil as claimed in claim 25 wherein the webs have joints with the concave pressure surface wall and the convex suction surface wall.

32. A hollow aerofoil structure as claimed in claim 31 the webs have joints with adjacent webs.

33. A hollow aerofoil as claimed in claim 32 wherein in the first region the webs extending substantially diagonally have attachment ends at the joints with the concave pressure surface wall and the convex suction surface wall, and the webs extending substantially perpendicularly are provided on the attachment ends of the webs extending substantially diagonally.

34. A hollow aerofoil as claimed in claim 31 wherein in the first region the joints between the webs extending substantially perpendicularly and the concave pressure surface wall and the convex suction surface wall are separate from the joints between the webs extending substantially diagonally and the concave pressure surface wall and the convex suction surface wall.

35. A hollow aerofoil as claimed in claim 25, wherein the webs extending substantially diagonally to the walls are arranged at angle between 40° and 50° to the walls.

36. A hollow aerofoil as claimed in claim 35 wherein the webs extending substantially diagonally to the walls are arranged at angle of 45° to the walls.

37. A hollow aerofoil as claimed in claim 25 wherein the webs extending substantially perpendicularly to the walls are arranged at an angle between 70° and 90° to the walls.

38. A hollow aerofoil as claimed in claim 37 wherein the webs extending substantially perpendicularly to the walls are arranged at an angle of 80° or 90° to the walls.

39. A hollow aerofoil as claimed in claim 25 wherein the hollow aerofoil is selected from the group comprising a hollow fan blade, a hollow fan outlet guide vane, a hollow propfan blade, a hollow propeller blade and a hollow engine section stator vane.

* * * * *